United States Patent Office 2,707,191
Patented Apr. 26, 1955

2,707,191

REACTION PRODUCTS OF ORGANOSILANES AND METHYLOL BENZENES

Robert W. Martin, Lafayette, Calif., and Kurt C. Frisch, Pittsfield, Mass., assignors to General Electric Company, a corporation of New York No Drawing. Application August 9, 1952,
Serial No. 303,615

13 Claims. (Cl. 260—448.8)

This invention is concerned with resinous compositions of matter having utility in the coating and laminating arts. More particularly, the invention relates to compositions of matter comprising the product of condensation or reaction of a mixture of ingredients comprising (1) a preformed methylol benzene compound corresponding to the general formula

I

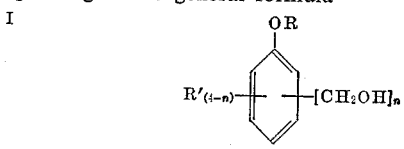

and (2) a hydrolyzable organosilane having the general formula:

II $\qquad Z_{(4-m)}SiX_m$ where R is a member selected from the class consisting of alkyl, hydroxyalkyl, alkenyl and aralkyl radicals, R' is a member selected from the class consisting of hydrogen, halogen, alkyl, and aryl radicals, Z is a monovalent hydrocarbon radical, X is a member selected from the class consisting of halogens, alkoxy radicals, and acyloxy radicals, and $m$ and $n$ are each integers equal to from 2 to 3, inclusive.

Among the groups which R may be are, for example, alkyl radicals, e. g., methyl, ethyl, propyl, isopropyl, butyl, hexyl, dodecyl, etc.; hydroxyalkyl radicals, for instance, hydroxyethyl, hydroxypropyl, hydroxyisopropyl, hydroxybutyl, etc. radicals; and aralkyl radicals, for instance, benzyl, phenylethyl, etc. radicals; alkenyl radicals, e. g., vinyl, allyl, methallyl, butenyl, etc. radicals. R', in addition to being hydrogen and alkyl radicals similar to those for which R may stand, may also be halogen, for instance, chlorine, bromine, fluorine, etc.; or an aryl radical, for instance, phenyl, naphthyl, biphenyl, etc. R' may be positioned anywhere around the benzene nucleus, e. g., the ortho, meta and para positions. The preparation of many of these methylol phenol derivatives may be found disclosed in Martin Patents 2,579,330 and 2,579,331 issued December 18, 1951.

Referring to the hydrolyzable organosilane corresponding to the Formula II, Z may be a monovalent hydrocarbon radical including saturated or unsaturated aliphatic radicals, for example, methyl, ethyl, propyl, isopropyl, butyl, hexyl, dodecyl, vinyl, allyl, methallyl, etc. radicals; cycloaliphatic radicals, for instance, cyclohexane, cyclopentane, cyclohexene, etc. radicals; aryl radicals, for instance, phenyl, naphthyl, biphenyl, etc. radicals; aralkyl radicals, for instance, benzyl, phenylethyl, etc. radicals; alkaryl radicals, for instance, tolyl, xylyl, etc. radicals. X may be a halogen, for example, chlorine, bromine, fluorine, etc.; alkoxy radicals of the formula —OR" where R" is the same alkyl radicals for which R may stand, and acyloxy radicals of the formula

—OCOR"

where R" has a meaning given above.

The reaction between the methylol benzene radical corresponding to Formula I and the hydrolyzable organosilane corresponding to the Formula II (hereinafter referred to as "silane") may be carried out under a variety of conditions. The silane and the methylol benzene derivative may be heated together at temperatures ranging, for example, from about 100 to 250° C. or more for lengths of time varying from about 10 to 45 minutes or more. While this is being done, the volatile products resulting from the reaction of the silane and the methylol benzene derivative are advantageously removed. These volatile products may comprise, for example, hydrogen halides, alkanols, or organic acids depending upon whether the hydrolyzable group is a halogen, an alkoxy radical, or an acyloxy radical.

The ratio of the silane to the methylol benzene derivative may be varied within wide limits. Generally, I prefer to employ these ingredients in approximately equivalent molar concentrations taking into account the number of methylol groups in the methylol benzene derivative and the hydrolyzable groups in the silane. Generally, there should be present a sufficient amount of the silane so that for each methylol group present in the methylol benzene there will be available for reaction at least one hydrolyzable group attached to the silicon atom of the silane. It may be desirable, in order to effect completion of the reaction, to use the silane in a molar excess over that required to react with the methylol groups of the methylol benzene derivative. Thus, for each mol of methylol benzene used, I may employ from about 1 to 2 or more molar equivalents of the silane, taking into consideration, as pointed out above, the number of methylol groups in the methylol benzene and the number of hydrolyzable groups on the silane. The examples below will illustrate some of the variations in the concentration of ingredients which may be employed in the practice of the invention.

Alternatively, instead of using the monomeric methylol benzene derivatives, one may condense the latter materials to give, for example, in the case of 2,6-dimethylol-4-methyl anisole, polymeric structures having the formula

III

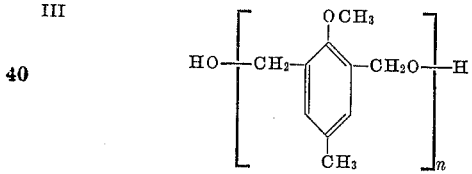

where $n$ is an integer greater than 1, e. g., from 2 to 15. To make the methylol-substituted condensation products containing phenyl-bonded methylol groups described above (having the Formula III), 4-methyl 2,6-dimethylol anisole is condensed with various acidic catalysts, for example, sulfamic acid, para-toluene sulfonic acid, urea hydrochloride, aniline sulfate, morpholine sulfate, etc., preferably in the presence of heat, for example, at temperatures of from about 125° to 200° C. for times varying from about 10 to 45 minutes or more. During this period of condensation, water may be evolved and it is desirable to provide means for removing this water. Thereafter, the polymeric methylol benzene, derivative described, for example, in Formula III may be caused to react with the silane having the Formula II in the manner described above. Obviously, in employing polymers of methylol benzene derivatives with the silane, the degree of intercondensation will depend on the number of methylol groups on the benzene nucleus. For obtaining polymers readily reactable with the silane, the number of methylol groups on the benzene nucleus is preferably restricted to two.

Once the reaction product between the silane and the methylol benzene derivative or the polymeric methylol benzene derivative is accomplished, further condensation of the compositions to the substantially insoluble infusible state may be effected by further addition of acidic catalysts, for example, those described above for accelerating the intercondensation of methylol benzene derivatives to polymers thereof. In each case the amount of acidic catalyst, whether to make the polymers of the methylol benzene derivatives or to convert the reaction products of the methylol benzene polymer with the silane, may be varied within wide limits. A useful range which has been found especially advantageous is one ranging, by weight, from about 0.001 to about 0.5 per cent of the acidic catalyst, based on the weight of the methylol benzene derivative (hereinafter so designated to include the reaction product of the monomeric methylol benzene compound with the silane as well as the reaction product of the polymeric methylol benzenes, e. g., Formula III, with the silane). Conversion of the intercondensation product (i. e., with the silane) by means of the acidic catalyst is preferably conducted at temperatures of the order of from about 125° to 250° C. or times varying as long as 10 to 30 minutes or more. For use in coating compositions, it is generally desirable to dissolve the intercondensation product in a suitable solvent, for example, toluene, xylene, etc., and add the catalyst to the solution to obtain useful coatings, laminating, and impregnating varnishes.

In order that those skilled in the art may better understand how the present invention may be practiced, the following examples are given by way of illustration and not by way of limitation. All parts are by weight.

*Example 1*

2,6-dimethylol-4-methyl anisole was prepared by first making para-cresol dialcohol. More particularly, 540 grams of para-cresol were dissolved in 770 grams of a sodium hydroxide aqueous solution containing 220 grams of sodium hydroxide. The solution was cooled and mixed with 830 grams of aqueous formaldehyde (37.2% formaldehyde). The mixture was held at 30 to 40° C. for two hours and allowed to stand for about 16 hours at room temperature. The sodium para-cresol dialcohol which separated out was neutralized with dilute acetic acid to give a crystalline product having the following formula:

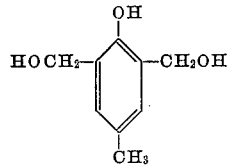

This compound when recrystallized from an alcohol-water solution had a melting point of 132° C. (literature shows this melting point to be about 130° C.). Analysis showed that there was present in the compound 64.5 per cent carbon (theoretical 64.25 per cent carbon), 7.19 per cent hydrogen (theoretical 7.19 per cent hydrogen) and 36.8 per cent methylol groups (theoretical 36.9 per cent methylol).

The methyl ether of para-cresol dialcohol was prepared as follows: 178.8 grams of the para-cresol dialcohol were added to a solution of 64 grams of sodium hydroxide in 600 ml. water. To this mixture were added slowly with rapid stirring approximately 140 grams dimethyl sulfate while maintaining the temperature at approximately 70° C. Stirring was continued for an additional 2 hours. On cooling, a precipitate separated which was removed by filtration. The precipitate was then purified to obtain essentially pure 4-methyl-2,6-dimethyl anisole melting at about 107° C. (the literature shows the melting point to be about 106.5° C.). This material was analyzed for carbon, hydrogen and methylol content with the following results: Carbon found 65.6 per cent (theoretical 65.8 per cent); hydrogen found 7.72 per cent (theoretical 7.74 per cent), methylol found 33.85 per cent (calculated 34.15 per cent methylol).

In addition to the method for preparing the ether described above, it will also be apparent that other ethers may be prepared using similar procedures. Taking, for instance, the caustic solution of the para-cresol dialcohol, one may prepare other alkyl or hydroxy alkyl ethers by reacting, for example, ethyl chloride, butyl chloride, ethylchlorohydrin, epichlorohydrin, etc. with the para-cresol dialcohol to give the corresponding ether derivative.

*Example 2*

50 grams of 2,6-dimethylol-4-methyl anisole and 0.005 gram sulfamic acid were heated together with stirring for 20 minutes at 190° C. During this period water was evolved and a tough, flexible polymer was formed. The polymer, which corresponded to that described on page 4 under Formula III, was dissolved in 100 grams of butyl acetate and 10 grams of methyl triacetoxy silane were added. From this mixture was applied a 6-mil wet film on a glass slide. The film was baked for 30 minutes at 150° C. to give a water white, water-repellent film possessing excellent gloss. The film was tough and very flexible and even after baking for one hour at 150° C. was still water white and flexible. The film was only mildly susceptible to attack by toluene indicating unexpected resistance to aromatic solvents, which ordinarily are highly detrimental to silicon-containing compositions.

*Example 3*

This example illustrates the type of products obtained by interacting a monomeric silane with the methylol benzene derivative also in the monomeric form. More particularly, 91 parts 2,6-dimethylol-4-methyl anisole and 44 parts dimethyl diacetoxysilane in the molar ratio of about 1 mol of the former to 0.5 mol of the latter were placed in a reaction vessel and heated over a low flame. The boiling point of the reaction mixture rose slowly from 150° C. to 275° C. during a period of 27 minutes, during which time acetic acid was removed. The loss in weight was about 21.9 parts. Since there was no evidence of loss of water during the heating period, it was evident that no intercondensation between methylol groups had taken place but rather reaction between the acetoxy groups and the methylol groups alone had taken place to give what was believed to be a major product having the following structure:

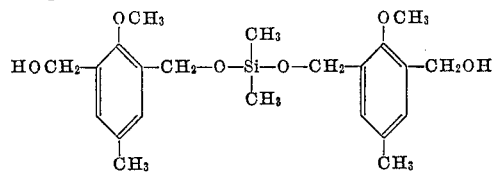

The temperature of the mixture was then lowered to about 200° C. and about 0.1 part sulfamic acid was added. There was an immediate and vigorous evolution of water accompanied by a rapid increase in viscosity indicating that the methylol groups were intercondensing. Although acetic acid was evolved during the reaction between the silane and the 2,6-dimethylol-4-methyl anisole, no such vigorous reaction was obtained nor were any apparent amounts of water present, thus indicating the specificity of the particular class of acidic catalysts described above for effecting condensation of methylol groups. The mixture was then heated for an additional 20 minutes at a temperature of about 200 to 290° C. during which additional water was given off to give a highly viscous polymer. The composition obtained above can be dissolved in various suitable solvents and used as a coating composition. Application of heat to this latter composition, together with the presence of additional small amounts of, for example, sulfamic acid, will give films which are substantially infusible and insoluble in many solvents and are tough and flexible. They are generally water white in color and adherent to the subsurface upon which the films therefrom are laid down.

*Example 4*

In this example, 22 parts methyl triacetoxysilane (0.1 mol) and 55 parts 2,6-dimethylol-4-methyl anisole (about 0.3 mol) were placed in a reaction vessel and heated for a time until the boiling point of the mixture rose from about 143° C. to 325° C. The reaction product showed scarcely any evidence of discoloration at this latter temperature. The weight loss at this point was about 16.5 parts as compared with a theoretical weight loss of 18 parts had the methyl triacetoxy silane reacted quantitatively with the elimination of 3 mols of acetic acid. The major product was believed to be a composition having the following formula:

IV

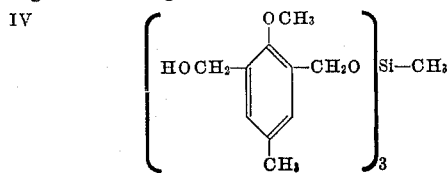

On cooling, the reaction mixture crystallized almost completely indicating the presence of simple chemical compositions and the lack of any detectable amounts of resin. To 20 parts of the above-identified material were added three parts of 2,6-dimethylol-4-methyl anisole and 0.05 part sulfamic acid. This mixture was heated at 200° C. for about 20 minutes. During this time water was evolved and at the end of the time the mixture had gelled to a substantially insoluble and infusible product. This indicated that the product obtained corresponding to Formula IV had functioned as a cross-linking agent for the 2,6-dimethylol-4-methyl anisole. The polymer thus obtained was very tough and practically colorless.

*Example 5*

In a reaction vessel were placed 40.8 parts of dimethyldibutoxysilane and a catalytic amount of sodium methoxide. The ingredients were heated to about 120° C. and to them were added gradually with stirring 21 parts of a mixture of allyl ethers of methylol phenols (the preparation of such ethers is more particularly described in Martin Patent 2,579,330 issued December 18, 1951). This latter mixture was then refluxed for about 1½ hours (the inside temperature of the reaction mass being about 130–140° C.). The mixture was thereby converted to a yellow rubbery solid which was insoluble in toluene and showed no flow when tested on a 200° C. hot plate.

*Example 6*

About 30 parts of a mixture of propanol ethers of methylol phenols (obtained by effecting reaction between a mixture of methylol phenols in a caustic solution with propylene oxide in the manner described in the aforesaid Martin patent and corresponding to the formula

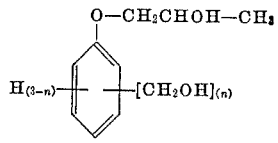

where $n$ is equal to from 1 to 3, inclusive) were mixed together with about 40.8 parts dimethyldibutoxysilane and the mixture refluxed for about 7½ hours after first adding a small amount of sodium methoxide to catalyze the reaction. The homogeneous yellow solution thus formed was distilled to remove butyl alcohol, the residual material thereafter mixed with an equal volume of toluene, and filtered to give a clear yellow resinous solution. This solution, when deposited as a film on a flat surface, either with or without a curing catalyst such as sulfamic acid, could be converted at elevated temperatures to a hard tack-free film.

*Example 7*

To a reaction vessel were added 137 parts of a 60 per cent methyl ethyl ketone solution of the mixture of propanol ethers of methylol phenol described in Example 6 and 200 parts trichloroethylene. To this stirred mixture were added slowly 122.5 parts phenyltrichlorosilane. Thereafter, the temperature was brought up to about 80° C. and 14 parts water were added to hydrolyze the excess phenyltrichlorosilane. The mixture was refluxed for one hour, most of the methyl ethyl ketone distilled, and the residual product cooled and washed with water. There was thus obtained a brown, slightly viscous liquid soluble in xylene. Films drawn from this varnish and then baked for one hour at 200° C. were clear and hard and showed good resistance to toluene.

*Example 8*

This example illustrates the manner in which the compositions herein defined may be modified by esterifying part of the methylol groups with a long chain fatty acid. More particularly, 30 parts of the mixture of propanol ethers of methylol phenol described in Example 6, 20 parts lauric acid together with 48 parts xylene were intimately mixed in a reaction vessel and about 1 part of phenyltrichlorosilane added to provide an acidic condition. The mixture was then refluxed for 3 hours while at the same time collecting 1.8 parts water in a trap. The mixture was cooled and to it were added gradually with stirring about 40.5 parts phenyltrichlorosilane. The mixture was refluxed for about 2½ hours to remove essentially all of the formed HCl. The last traces of HCl were removed by distilling with water and trichloroethylene. The product thereby obtained was a light brown, clear varnish having about 60 per cent solids. Films cast from this material and baked one hour at 200° C. were hard, clear, water-repellent and had good solvent resistance.

*Example 9*

To a mixture of 210 grams of the allyl ethers of methylol phenol (more particularly described above) and 375 cc. toluene were added slowly with stirring 193.5 grams dimethyldichlorosilane. The mixture was then refluxed for about 3 hours and distilled under vacuum (about 20 mm.) until the internal temperature of the reaction mixture reached about 110° C. There was thus obtained a white viscous liquid soluble in toluene which could be used for coating purposes and could be baked at elevated temperatures to a hard state.

*Example 10*

In this example, to a mixture of 28.6 grams of the mixture of propanol ethers of methylol phenols described in Example 6 and 80 cc. of toluene were added slowly with stirring 51.6 grams dimethyldichlorosilane. The mixture was refluxed for about 3 hours and thereafter distilled in vacuo (20 mm.) until the inside temperature of the reaction mass reached 125° C. A sample of the yellow liquid thus obtained when heated on a hot plate at 200° C. cured in 15 seconds to a hard, tack-free film.

*Example 11*

A mixture of 30 grams of the mixture of propanol ethers of methylol phenols described in Example 6, 30 grams of abietic acid, and 80 cc. toluene was refluxed for about 2½ hours while at the same time removing about 1.8 cc. water in a water trap. To this solution were added gradually and with stirring 25.8 grams dimethyldichlorosilane. After the addition was completed, the mixture was refluxed for about 2½ hours until no further evidence of HCl fumes could be detected. There was thus obtained a yellow clear varnish which when cast in the form of a film and baked at 150° C. for one our gave a dried, hard, clear resinous film.

It will, of course, be understood by those skilled in the art that other methylol benzene derivatives or condensation products of such derivatives may be employed in place of those used in the foregoing example without departing from the scope of the invention. Among these may be mentioned ethers of, for example, para-ethyl phenol dialcohol, para-isopropyl phenol dialcohol, para-tertiary butyl phenol dialcohol, para-cyclohexyl phenol dialcohol, para-phenyl phenol dialcohol, 3,4-dimethyl phenol dialcohol, etc., as well as 4-isopropyl-2,6-dimethylol anisole, 4-tertiary butyl-2,6-dimethylol anisole, 4-cyclohexyl-2,6-dimethylol anisole, 4-phenyl-2,6-dimethylol anisole, 3,4-dimethyl-2,6-dimethylol anisole, 2,4-dimethylol anisole, 4-methyl-2,6-dimethylol anisole, 3,4-dimethyl-2,6-dimethylol anisole, 1-hydroxyethoxy-2,6-dimethylol benzene having the formula

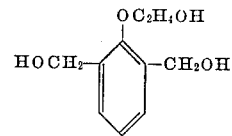

1-hydroxy ethoxy-2,6-dimethylol-4-methyl benzene, etc. Additional examples of the methylol benzene derivatives which may be employed can be seen from the various values described for R and R' and $n$ in Formula I.

Additionally, other hydrolyzable organosilanes having the formula $$Z_{(4-m)}SiX_m$$

where Z, X and $m$ have the values given above may also be used in place of the methyl acetoxy silanes described in the examples above. Thus, one may employ, for example, dimethyldichlorosilane, methyltrichlorosilane, methyldichlorsilane, dimethyldiethoxy silane, methyltriethoxysilane, phenyltrichlorosilane, diphenyldichlorosilane, diphenyldiethoxysilane, methyltripropionoxy silane, diethyldichlorosilane, dibutyldibromosilane, methylphenyldiacetoxy silane, methyltolyldichlorosilane, etc.

As pointed out above, the reaction of the silane may be carried out with the monomeric methylol benzene derivative or with the polymers of the methylol benzene derivatives containing methylol groups on the benzene nucleus.

In addition to the uses described for the materials in the foregoing examples, the compositions herein disclosed and claimed can also be used as intermediates in the preparation of other compositions. The presence of the hydroxyl groups on the methylol radicals of the intercondensation product of the silane and the methylol benzene derivative indicates that further reaction of the materials, for example, with long chain fatty acids may be accomplished to give esters which may be employed as plasticizers for various resins including phenolic resins, silicone resins, vinyl halide resins, for example, polyvinyl chloride or copolymers of vinyl chloride and vinyl acetate, etc. The compositions herein described may also be employed, as pointed out above, for coating compositions by themselves or may be interacted with additional amounts of difunctional or trifunctional methylol benzene derivatives, for example, methylol benzene derivatives containing from 2 to 3 methylol groups on the benzene nucleus which imparts added functionality. A mixture of such compositions may be dissolved in various solvents and used alone or with various pigments or dyes to form useful enamels and coating compositions having good resistance to many solvents and caustics. The same solutions may also be used to coat and impregnate various cloths, for example, glass cloth, asbestos cloth, cotton cloth, etc., which can then be superposed and laminated under heat and pressure to give compact laminated panels having use in the architectural or electrical arts.

What we claim as new and desire to secure by Letters Patent in the United States is:

1. A composition of matter comprising the product of reaction under the influence of heat of a mixture of ingredients consisting essentially of (1) a hydrolyzable organosilane corresponding to the general formula $$Z_{(4-m)}SiX_m$$

and (2) a preformed methylol benzene derivative selected from the class consisting of (a) compounds having the general formula

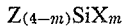
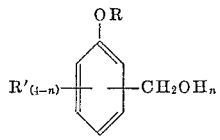

and (b) auto condensation products of the methylol benzene derivatives described in (a), wherein there are present at least two methylol groups on the benzene nucleus, where Z is a monovalent hydrocarbon radical, X is a member selected from the class consisting of halogens, alkoxy, and acyloxy radicals, R is a member selected from the class consisting of alkyl, alkylene, and hydroxyalkyl radicals, R' is a member selected from the class consisting of hydrogen, halogen, alkyl, and aryl radicals and n and m are each integers equal to from 2 to 3, inclusive.

2. A composition of matter comprising the product of reaction under the influence of heat of a mixture of ingredients consisting essentially of (1) dimethyl diacetoxy silane and (2) 2,6-dimethylol-4-methyl anisole.

3. A composition of matter comprising the product of reaction under the influence of heat of a mixture of ingredients consisting essentially of (1) methyltriacetoxy silane and (2) 2,6-dimethylol-4-methyl anisole.

4. A composition of matter comprising the product of reaction under the influence of heat of a mixture of ingredients consisting essentially of (1) methyl triacetoxy silane and (2) the preformed product of condensation obtained by heating 2,6-dimethylol-4-methyl anisole in the presence of an acidic catalyst, the said condensation product containing at least two phenyl-bonded methylol groups.

5. A composition of matter comprising the product of reaction under the influence of heat of a mixture of ingredients consisting essentially of phenyltrichlorosilane and a mixture of propanol ethers of methylol phenol in which the propanol radical is attached directly to the benzene nucleus by means of an oxygen atom.

6. A composition of matter comprising the product of reaction under the influence of heat of a mixture of ingredients consisting essentially of dimethyldichlorosilane and a mixture of allyl ethers of methylol phenol in which the allyl group is attached directly to the benzene nucleus through the medium of an oxygen atom.

7. The process which comprises heating a mixture of ingredients consisting essentially of a hydrolyzable organosilane corresponding to the general formula $$Z_{(4-m)}SiX_m$$

and a preformed methylol benzene derivative selected from the class consisting of (a) compounds having the general formula

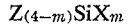
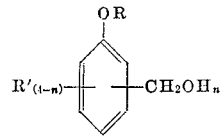

and (b) auto condensation products of the methylol benzene derivatives described in (a) wherein there are present at least two methylol groups on the benzene nucleus, where Z is a monovalent hydrocarbon radical, X is a member selected from the class consisting of halogens, alkoxy, and acyloxy radicals, R is a member selected from the class consisting of alkyl, alkylene, and hydroxyalkyl radicals, R' is a member selected from the class consisting of hydrogen, halogen, alkyl, and aryl radicals, and n and m are each integers equal to from 2 to 3, inclusive.

8. The process which comprises heating a mixture of ingredients consisting essentially of (1) dimethyl diacetoxy silane and (2) 2,6-dimethylol-4-methyl anisole.

9. The process which comprises heating a mixture of ingredients consisting essentially of (1) methyltriacetoxy silane and (2) 2,6-dimethylol-4-methyl anisole.

10. The process which comprises heating a mixture of ingredients consisting essentially of (1) methyl triacetoxy silane and (2) the product of condensation obtained by heating 2,6-dimethylol-4-methyl anisole in the presence of an acidic catalyst, the said condensation product containing at least two phenyl-bonded methylol groups.

11. The process which comprises heating a mixture of ingredients consisting essentially of (1) dimethyldibutoxysilane and (2) a mixture of allyl ethers of methylol phenol in which the allyl group is attached directly to the benzene nucleus by an oxygen atom.

12. The process which comprises heating a mixture of ingredients consisting essentially of (1) phenyltrichlorosilane and (2) a preformed mixture of propanol ethers of methylol phenol in which the propanol radical is attached directly to the benzene nucleus by means of an oxygen atom.

13. The process which comprises heating a mixture of ingredients consisting essentially of (1) dimethyldichlorosilane and (2) a mixture of allyl ethers of methylol phenol in which the allyl group is attached directly to the benzene nucleus through the medium of an oxygen atom.

References Cited in the file of this patent

UNITED STATES PATENTS

| | | |
|---|---|---|
| 2,182,208 | Nason | Dec. 5, 1939 |
| 2,386,793 | Hanford | Oct. 16, 1945 |
| 2,441,066 | Hanford | May 4, 1948 |